Figure 1:
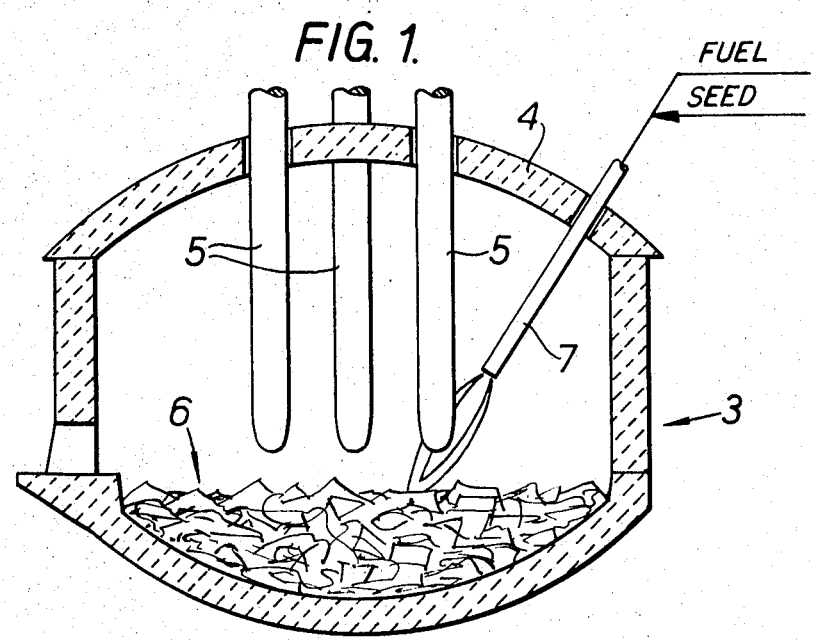

United States Patent
Bryce

[11] 3,730,961
[45] May 1, 1973

[54] ARC IGNITION BY SEEDED GAS

[75] Inventor: Laurence Miller Bryce, Fife, Scotland

[73] Assignee: British Steel Corporation, London, England

[22] Filed: Jan. 4, 1972

[21] Appl. No.: 215,310

[30] Foreign Application Priority Data

Jan. 22, 1971 Great Britain...................2,970/71

[52] U.S. Cl.................................................13/9
[51] Int. Cl...........................................H05b 7/00
[58] Field of Search....................13/9, 18; 219/74

[56] References Cited

UNITED STATES PATENTS

| | | | |
|---|---|---|---|
| 2,927,142 | 3/1960 | La Bate | 13/9 X |
| 3,197,539 | 7/1965 | Hinds | 13/9 |
| 3,459,867 | 8/1969 | Estes | 13/9 |

Primary Examiner—Roy N. Envall, Jr.
Attorney—Bacon & Thomas

[57] ABSTRACT

A method of igniting an arc furnace in which a hot fluid is introduced into the space between an electrode and the charge, the fluid being seeded with a compound which is ionized at the subsisting temperature whereby to promote breakdown of, and initiate an arc across, the said space. The fluid may be fuel oil or a gas and is preferably aflame; it may be applied from an independent torch or it may issue from the electrode itself. The seed may be a salt of potassium or caesium.

14 Claims, 2 Drawing Figures

Patented May 1, 1973 3,730,961

ARC IGNITION BY SEEDED GAS

This invention relates to a method of igniting an arc furnace.

The invention enables the electrical characteristics of the arc to be stabilized giving rise to an increase in the rate of electrical power input, and thus, a reduction in the melting time, and also a reduction in the power flicker from the supply source.

Arc furnaces of the "direct" type in which an arc is struck between an electrode and the charge are conventionally ignited by moving the electrode into contact with the scrap metal charge in the basket so as to create a short-circuit and then the electrode is withdrawn upwards drawing an arc with it. The major disadvantages associated with this action are the low power input to the charge before a stable arc is obtained and, to a lesser degree, the chance of breaking the electrode as it strikes the charge.

It is an object of this invention to overcome these drawbacks.

From one aspect the present invention consists in a method of igniting an arc furnace in which a hot fluid is introduced into the space between an electrode and the charge in the furnace, the fluid being seeded with a compound which is ionized at the subsisting temperature whereby to promote breakdown of, and initiate an arc across, the said space.

Thus, in accordance with this invention, the hot seeded fluid creates a high conductivity path across the said space, and in addition promotes electron emission from the cathode (alternately the electrode and charge) by decreasing the work function and increasing the temperature at the metal and graphite surfaces. As a result the presence of the hot seeded fluid enables the available transformer open-circuit voltage to strike an arc without recourse to short-circuiting.

The fluid may be a fuel oil or a gas and is preferably aflame; this flame may be kept in situ during the melting process so as to stabilize the arc throughout the whole period for which it is running. In this manner the electrical characteristics of the arc are stabilized giving rise to:

a. an increase in the rate of electrical power input and thus a reduction in the melting time b. a reduction in the power flicker from the supply source.

The flaming fluid may be applied from an independent torch or it may issue from the electrode itself the electrode being of tubular construction for this purpose to allow the fluid to flow through it and issue from the tip. For a gaseous fluid oxy/acetylene or oxy/natural gas may be employed.

The seed may be a low ionization salt, e.g. a salt of potassium, caesium or sodium and it may be independently introduced into the flame or indeed it may be implanted in the electrode itself.

If the salts are added through a tubular electrode as described then they need only be added for as long as is desired. For example, after the arc has been well established there may be little benefit to gain from the addition of low ionization salts so far as the electrical characteristics are concerned so the supply can be arrested. Different salts or gases can then be introduced for other purposes, e.g. salts or gases which are high in hydrogen content are operative to increase the voltage gradient and so shorten the arc length and thus can be introduced to save refractory wear on the walls of the vessel.

Figure 2:
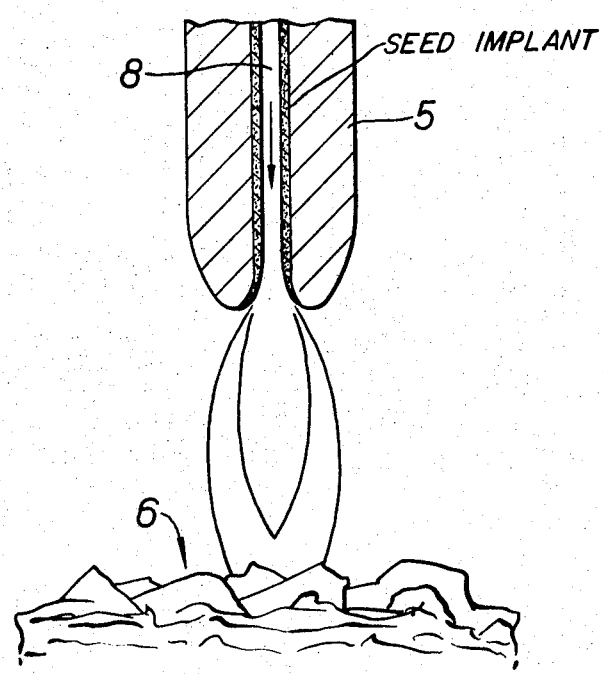

In order that the invention may be fully understood, two embodiments thereof will now be described, by way of example, with reference to the accompanying drawings in which:

FIG. 1 schematically illustrates an electric arc furnace with the seeded flame being introduced through a separate torch; and FIG. 2 illustrates a tubular electrode through which the seeded flame is introduced.

Referring now to FIG. 1, there is shown a three-phase arc furnace having a shell 3 and a roof 4 through which extend three carbon or graphite electrodes 5. The furnace is shown charged with steel scrap 6. A torch or lance 7 extends through the roof of the vessel and is directed to a position between one of the electrodes 5 and the scrap charge. Similar torches are associated with the other two electrodes but these have not been illustrated in the interests of clarity.

In operation the scrap is charged, e.g. through the roof which slides away, and the electrodes are then lowered through the roof towards the charge.

A seeded gaseous fuel, e.g. oxy/natural gas seeded with $K_2CO_3$ or KCl, is then introduced through each torch 7 directed so that on ignition the flame impinges on the electrode tip and thence on to the charge. These salts may be applied either in a powdered or a gaseous form, in particular, the powdered salt may be vaporized at a temperature of say 600° C before being introduced into the carrier gas. The temperature of the flame, of the order of 1,900° C is such that the salts ionize creating a high conductivity path between the electrode and the charge locally coating them with seed thus facilitating the emission of electrons and enabling an arc to be struck across the gap. In practice it has been found that by this method an arc can be struck across a gap of 8cms or more with 15 cm. diameter electrodes in a 'cold' furnace at a typical open-circuit potential of 400 volts a.c.; this will reduce to a figure of 200 volts or so on ignition.

As an alternative to the arrangement shown, the seeded fuel may be introduced through the electrodes themselves, the electrodes being constructed in a tubular fashion for this purpose. Such an electrode is illustrated in FIG. 2.

In this instance a tubular electrode 5 has a bore 8 extending through it, through which a gaseous fuel is passed, the gas igniting as it issues from the tip on to the charge 6 below. As before, the gas may embody a low ionization seed or the seed may be implanted in the electrode itself, e.g. a cored electrode may be used, the seed being released as the electrode erodes in the severe operating environment.

The principle of operation is the same as before, with the ionized gas promoting breakdown to initiate an arc across the gap. In this instance however there is no direct heating of the electrode tip by the flame. Therefore to obtain arc ignition with a cold electrode, the gap has to be shortened to some 3 cm to allow for reflection of the flame from the charge to heat the electrode sufficiently to obtain electron emission. On production furnaces however, generally there would be no need for any electrode heating as the electrodes would be red hot from the previous cast. The gap which could be broken down in these circumstances should therefore be at least 8 cm.

As mentioned above, the application of salts and gases through the hollow electrodes may be readily controlled and therefore also the 'form' of the arc.

Using either an independent burner or a hollow electrode the flame may be maintained advantageously throughout the duration of the melting process since the arc tends to stabilize itself within the flame, which precludes it from wandering around the surface of the charge thus mitigating erosion of the furnace walls and, more importantly, regularizing and stabilizing the consumption of electrical power with time, enabling a faster melting rate to be obtained. Calculations indicate that a reduction in the melt-down time of the order of 5 percent should be obtained on production furnaces. Further, apart from leading to an improvement in the melt-down performance, smoothing of the electrical characteristics may be even more important in their own right, as a reduction in flicker would save the electrical components and also suit the electricity suppliers.

All of the consumables suggested are relatively inexpensive in the quantities required; and bearing in mind that since the flame impinges on the bath there is no wastage of heat from this source.

We claim:

1. A method of initiating an arc between an electrode and a metal charge in an arc furnace comprising:
   introducing a hot fluid into the space between the electrode and the charge whilst the power to the furnace is on, and seeding the fluid with a compound which is ionizable at the subsisting temperature of said hot fluid in said space to thereby promote breakdown of, and initiate an arc across, the said space.

2. A method according to claim 1, wherein the fluid is aflame.

3. A method according to claim 2, wherein the fluid is maintained in position during the subsequent melting process so as to stabilize the arc.

4. A method according to claim 3, wherein the fluid is introduced through a torch.

5. A method according to claim 3, wherein the electrode is of tubular construction and the fluid is introduced through the electrode bore.

6. A method of initiating an arc between an electrode and a metal charge in an arc furnace comprising:
   seeding a fuel with a low ionization salt, projecting said seeded fuel from a torch, igniting the projected fuel and directing the resulting flame into the space between the electrode and the charge, the salt being ionizable at the temperature of the flame to thereby promote breakdown of and initiate an arc across, the said space.

7. A method according to claim 6, wherein the salt is any of the alkali metals selected from the following group — potassium, caesium, sodium.

8. A method according to claim 7, wherein the fuel is a medium selected from the following group — gas, oil.

9. A method according to claim 8, wherein the projection of the fuel is maintained during the subsequent melting process whereby to stabilize the arc.

10. A method according to claim 9, wherein the introduction of the seed to the fuel is arrested prior to the termination of the fuel flow.

11. A method of initiating and controlling an arc between an electrode and a metal charge in an arc furnace comprising:
    introducing a hot fuel into the space between the electrode and the charge whilst the power is on, seeding the fuel with a low ionization compound which is ionized at the subsisting temperature to promote breakdown of, and initiate an arc across, the said space and introducing different ionization compounds into the fuel as melting progresses to impart particular characteristics desired of the arc.

12. A method of initiating an arc between an electrode and a metal charge in an arc furnace comprising:
    directing a flaming fluid on to the electrode and across the space between the electrode and the charge whilst the power to the furnace is on, and seeding the fluid with a compound which is implanted in the electrode the compound being ionizable at the subsisting temperature of the flame to promote breakdown of, and initiate an arc across, the said space.

13. Apparatus for initiating and controlling an arc between an electrode and a metal charge in an arc furnace comprising,
    in combination with said arc furnace,
    a torch
    means for directing the torch into the furnace and into the space between the electrode and the charge
    means for projecting and igniting fuel through the torch, and means for seeding the fuel with a low ionization compound which is ionized at the subsisting temperature to promote breakdown of and initiate an arc across, the said space.

14. Apparatus for initiating and controlling an arc between a hollow electrode and a metal charge in an arc furnace, comprising, in combination with said arc furnace and hollow electrode,
    means for projecting and igniting fuel through the hollow electrode, and means for seeding the fuel with a low ionization compound ionizable at the subsisting temperature to promote breakdown of and initiate an arc across the gap between the electrode and the charge.

* * * * *